(12) United States Patent
Moulis, Jr. et al.

(10) Patent No.: US 7,982,698 B2
(45) Date of Patent: *Jul. 19, 2011

(54) LOW POWER LED VISUAL MESSAGING DEVICE, SYSTEM AND METHOD

(75) Inventors: Laurence E. Moulis, Jr., Charlottesville, VA (US); Richard W. Massie, Roseland, VA (US)

(73) Assignee: Inova Solutions, Inc., Charlottesville, VA (US)

( * ) Notice: Subject to any disclaimer, the term of this patent is extended or adjusted under 35 U.S.C. 154(b) by 1192 days.

This patent is subject to a terminal disclaimer.

(21) Appl. No.: 11/599,036

(22) Filed: Nov. 14, 2006

(65) Prior Publication Data

US 2007/0115273 A1 May 24, 2007

Related U.S. Application Data

(60) Provisional application No. 60/736,433, filed on Nov. 14, 2005.

(51) Int. Cl.
*G09G 3/32* (2006.01)
(52) U.S. Cl. ............................................ 345/82; 345/83
(58) Field of Classification Search .................. 345/87, 345/2, 204, 39, 173, 56, 82, 83; 362/492; 315/185 R; 174/50; 455/445; 713/189; 340/815.4, 838, 815.45, 286.02; 359/838, 359/865; 726/36
See application file for complete search history.

(56) References Cited

U.S. PATENT DOCUMENTS

| | | | |
|---|---|---|---|
| 4,441,106 A | 4/1984 | Jackson | |
| 4,845,481 A | 7/1989 | Havel | |
| 5,134,387 A | 7/1992 | Smith et al. | |
| 5,218,629 A | 6/1993 | Dumond, Jr. et al. | |
| 5,451,979 A | 9/1995 | Levac | |
| 6,144,363 A | 11/2000 | Alloul et al. | |
| 6,160,541 A | 12/2000 | Palalau et al. | |
| 6,288,497 B1 * | 9/2001 | Chang et al. | 315/185 R |
| 6,614,450 B1 | 9/2003 | Vossler | |
| 6,748,180 B2 | 6/2004 | Feng | |
| 6,844,823 B2 * | 1/2005 | Hooks et al. | 340/815.45 |
| 7,221,331 B2 | 5/2007 | Bear et al. | |
| 7,221,624 B2 * | 5/2007 | Harrison, Jr. | 368/28 |
| 7,633,405 B2 * | 12/2009 | Moulis et al. | 340/815.45 |
| 2002/0159270 A1 * | 10/2002 | Lynam et al. | 362/492 |
| 2003/0020603 A1 * | 1/2003 | DeLine et al. | 340/425.5 |
| 2003/0128131 A1 * | 7/2003 | Skiver et al. | 340/815.4 |
| 2003/0151418 A1 | 8/2003 | Leger | |

(Continued)

OTHER PUBLICATIONS

Office Action, Related U.S. Appl. No. 11/599,035, Dec. 17, 2008, United States Patent Office.

*Primary Examiner* — Prabodh M Dharia
(74) *Attorney, Agent, or Firm* — Williams Mullen, PC; Thomas F. Bergert

(57) ABSTRACT

A visual messaging system and device can employ high efficiency LEDs and current driven versus voltage driven circuits to reduce power consumption and enable the device to be powered from IEEE 802.3af (Power over Ethernet (PoE)) standard based power sources. The device can be powered from a local area network (LAN) connection using PoE, and does not require a separate AC power supply. The present invention also uses a 1× yellow algorithm to create the yellow color with one half the instantaneous current of previous circuits. The device can incorporate multiple message inputs for receiving and displaying messages having different priorities, allowing higher priority messages to override lower priority messages.

3 Claims, 4 Drawing Sheets

U.S. PATENT DOCUMENTS

| | | |
|---|---|---|
| 2003/0193483 A1* | 10/2003 | Neville .......................... 345/173 |
| 2004/0032338 A1* | 2/2004 | Hooks et al. ............. 340/815.45 |
| 2004/0068583 A1* | 4/2004 | Monroe et al. ................ 709/246 |
| 2005/0156925 A1 | 7/2005 | Fong et al. |
| 2005/0224691 A1 | 10/2005 | Van Arendonk et al. |
| 2006/0066554 A1* | 3/2006 | Baba et al. ...................... 345/98 |
| 2006/0185876 A1* | 8/2006 | Aviv ............................... 174/50 |
| 2006/0190739 A1* | 8/2006 | Soffer ............................ 713/189 |
| 2007/0066316 A1* | 3/2007 | Hoover .......................... 455/445 |
| 2007/0115208 A1* | 5/2007 | Moulis et al. .................... 345/39 |
| 2007/0128899 A1* | 6/2007 | Mayer ............................ 439/152 |
| 2007/0220618 A1* | 9/2007 | Holmes et al. .................. 726/36 |
| 2008/0177994 A1* | 7/2008 | Mayer ............................... 713/2 |
| 2010/0090860 A1* | 4/2010 | Moulis et al. ............. 340/815.45 |

* cited by examiner

LOW POWER LED VISUAL MESSAGING DEVICE, SYSTEM AND METHOD

REFERENCE TO RELATED APPLICATIONS

This application claims the benefit pursuant to 35 U.S.C. §119(e) of U.S. provisional patent application Ser. No. 60/736,433, filed Nov. 14, 2005, the disclosure of which is incorporated herein by reference.

FIELD OF THE INVENTION

The present invention relates to LED displays, and more particularly to networked displays operating within a messaging system and capable of operating efficiently using low power.

BACKGROUND

Visual display units or messaging devices are capable of displaying visual messages and symbols using an array of illuminating members, such as LEDs (light emitting diodes). Typical power sources for such devices are alternating current power sources such as might power a computer or other electronic device. Typical LED displays can emit red, green and yellow pixels. In conventional LED displays, yellow color is achieved by powering both a red and green LED die within the same pixel simultaneously. The human eye integrates the two colors to form yellow. In this manner, the color yellow requires twice as much current as simply displaying red or green.

Network-enabled messaging devices can receive messages and instructions for displaying messages from a computer or other remote device connected through a local area network (LAN), wide area network (WAN) or the Internet, for example. IEEE standard 802.3 af for Power over Ethernet (PoE) allows power to be provided through a single conduit such as a standard LAN cable (e.g., twisted pair, CAT-5), for example. However, PoE circuits are limited to providing only 15.4 Watts of power. As such, traditional LED displays cannot take advantage of PoE technology, because they cannot operate on lower wattage power sources to sufficiently power the operating needs of the device.

SUMMARY OF THE PRESENT INVENTION

The present invention provides a new display that uses significantly less power than typical LED displays. The present invention gains efficiency from three techniques in combination that each contributes power savings of approximately 50%. This invention can use high efficiency LEDs, current driven vs. voltage driven circuits, and a 1× yellow algorithm as described herein which creates the yellow color with one half the instantaneous current of previous circuits. These power efficiency steps result in a display with dramatically reduced power consumption. This acts as an enabling technology allowing the display to be powered from IEEE 802.3af (Power over Ethernet (PoE)) standard based power sources built into certain premises LAN equipment. Such an LED display then can be powered from the LAN connection in the overall messaging system, and does not require a separate AC power supply. Power efficiency in this application is a key concern because PoE is only specified to deliver 15.4 Watts of power.

In the new LED display according to the present invention, yellow color is achieved by illuminating the red LED within a pixel for a pre-programmed dwell time, and then illuminating the green LED within the pixel for the same pre-programmed dwell time. The human eye integrates these time-separated colors in such a way as to form the color yellow. The instantaneous current required to form yellow is thus reduced to one half. The present invention can be embodied as a messaging system employing one or more remote messaging units and a low power drawing LED display capable of using PoE standard based power sources. In one embodiment of the present invention, the LED display or readerboard can be connected to multiple remote messaging units wherein at least two of the units communicate with different priorities such that any messages from the first device will override any messages from the second device.

DETAILED DESCRIPTION OF A PREFERRED EMBODIMENT

Figure 1:
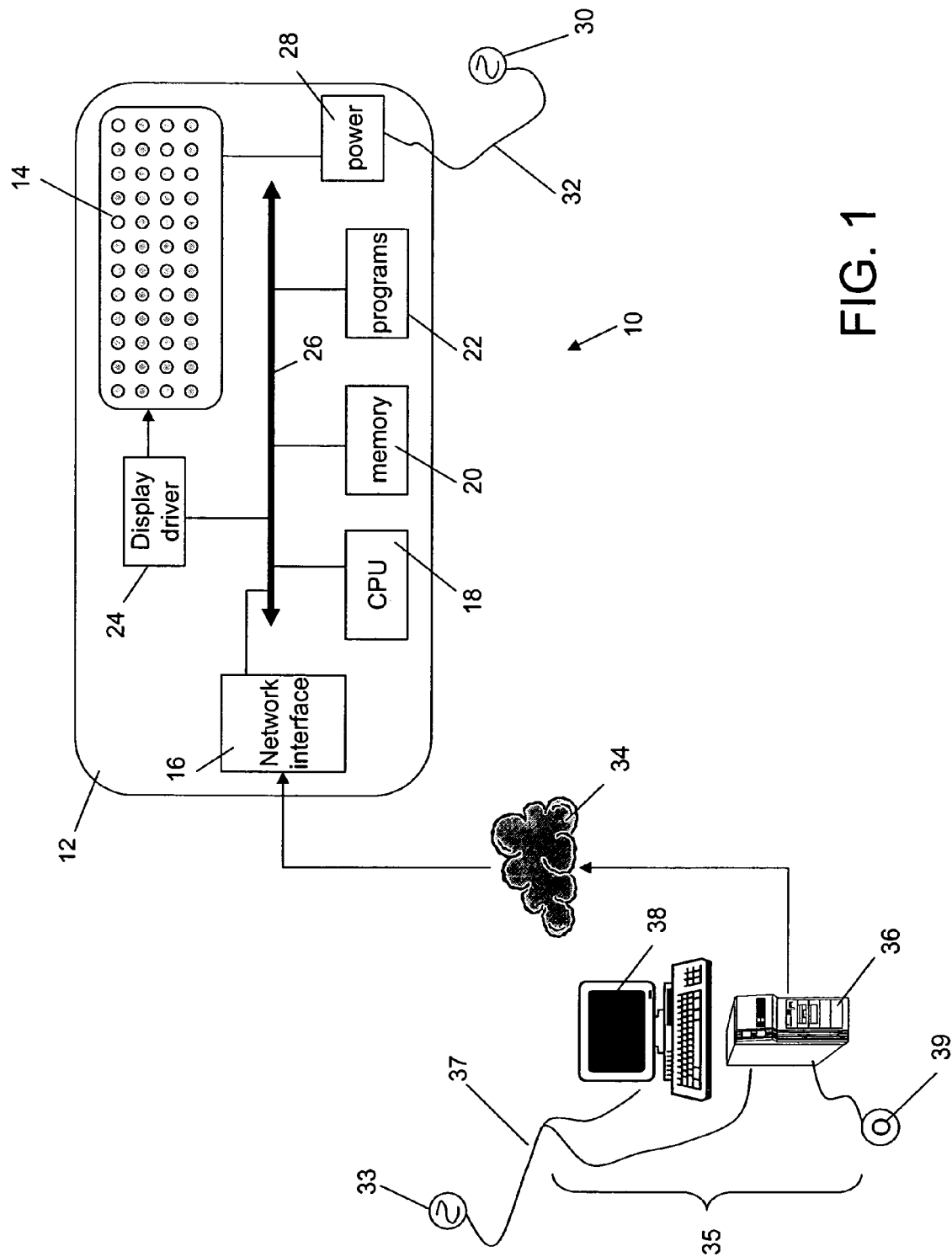
FIG. 1 is a schematic diagram of a network-enabled LED display or reader board.

As shown in FIG. 1, an implementation 10 of a network-enabled message display board or reader board 12 can include a display 14, a network interface 16, a CPU 18, a memory 20, one or more programs 22 for operating the display 14, and a display driver 24 for converting the program instructions into information understandable by the display 14. The interface 16, CPU 18, memory 20, programs 22, and display driver 24 can communicate along a common system bus 26 as will be understood by those of ordinary skill in the art, although other embodiments involving secondary buses, cache memory and alternative layouts will be understood as being contemplated herein to the extent compatible. The message board 12 can be powered by a power source 30 connected at input 28 by power cord 32 in accordance with conventional means. Power source 30 will typically be an alternating current power source.

Network interface 16 can receive input from an external device, such as computer system 35 over a network 34, such as a public network (e.g., the Internet), a private network, WAN, MAN, or LAN, for example. Computer system 35 can comprise CPU 36, monitor/keyboard 38 and other known and associated components (e.g., mouse, memory, printer, etc.). Computer system 35 can be powered by power source 33 via power cable 37, and can further be (optionally) connected to an external network 39 as desired. Power source 33 can be a standard AC power source, for example.

Figure 2:
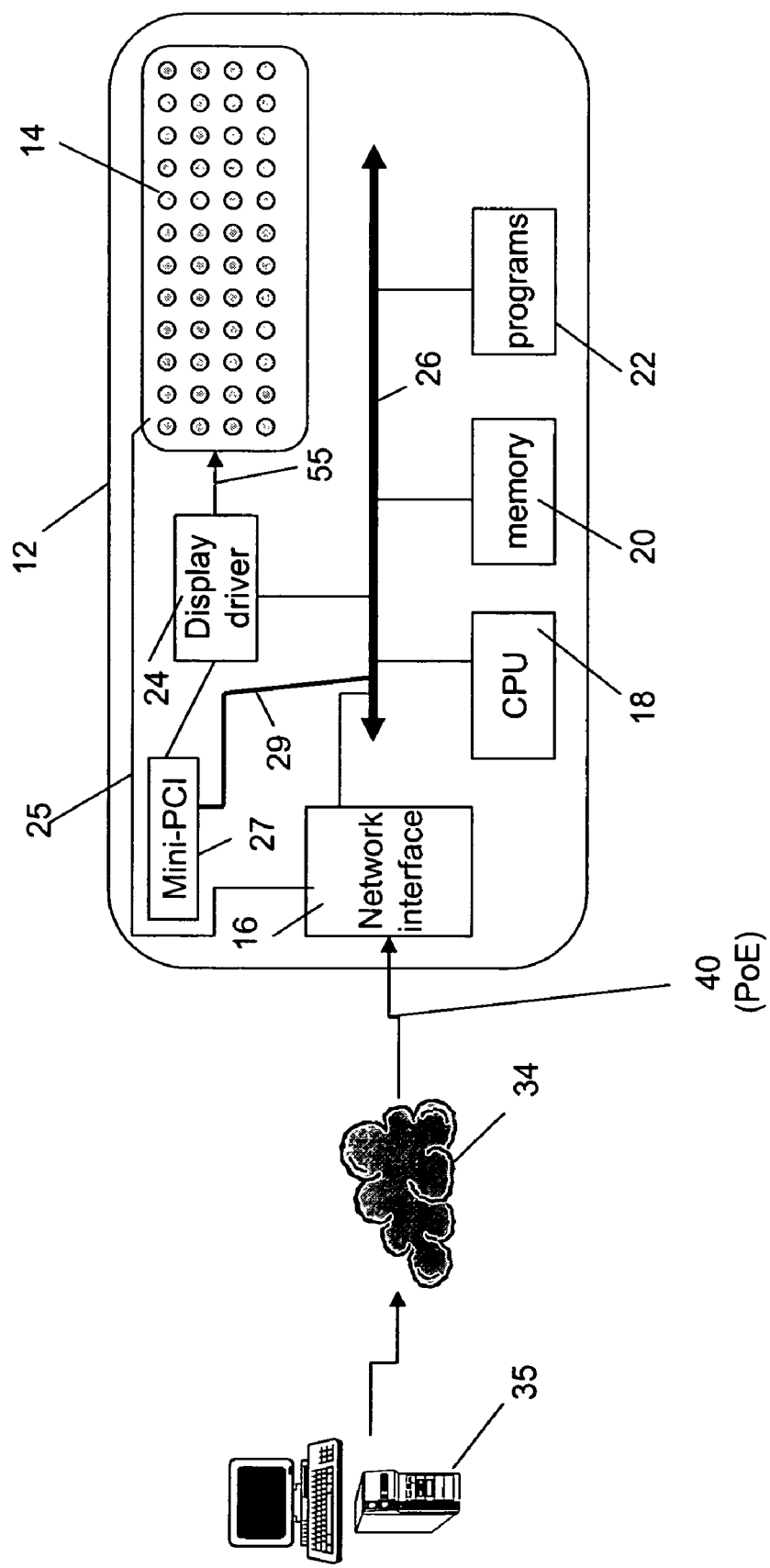
FIG. 2 is a sample schematic diagram illustrating a network-enabled LED display or reader board powered using Power over Ethernet (PoE) technology in accordance with one aspect of the present invention.

As shown in FIG. 2, in one embodiment of the present invention, messaging device 12 can be powered via IEEE 802.3(af) Power over Ethernet (PoE) standard based power sources, which are, and can be, built into existing network (e.g., LAN) equipment. As such, the messaging device does not require a separate power supply, and the power can be fed along a single conduit such as internal line 25, as shown in FIG. 2. Because PoE is only specified to deliver 15.4 Watts of power, the device of the present invention must be adapted for exceptional, and heretofore unknown, power efficiency. While the readerboard may routinely be used to display word messages in a variety of fashions and formats (e.g., scrolling, static, bold, flashing, etc.), it can also be used to display characters, images, and non-word messages and displays. It will therefore be appreciated that the present invention messaging device is not intended to particularly relate only to devices that can display verbal messages comprising characters and words, but rather to devices that can display visual display material beyond simply words and characters (e.g., arrows, symbols, non-ASCII characters, images, pictures, etc.).

Accordingly, a further aspect of the present invention pertains to efficient power handling for networked message display devices: In this regard, the present invention can incorporate LEDs such as high efficiency aluminum-indium-gallium-phosphide (AlInGaP) LEDs with both one red LED die and one green LED die occupying each pixel. In such an arrangement, the individual red and green colors can be represented to the viewer under lower power requirements suitable for use with PoE. However, the representation of more distinct colors (e.g., yellow) as required for effective LED message display in many circumstances becomes complicated in this arrangement. Typically, one desiring to display yellow using red and green LEDs would send appropriate power to each LED at the same time, causing both to emit a combined yellow display. Such a simultaneous power draw would exceed the PoE power capacity. The present invention overcomes this as described below.

One aspect of the invention addresses this problem by providing a Mini-PCI based computer card, known as the AREcard™, which functions in a similar manner as a computer video card, but is designed to operate an LED display. A Mini-PCI card is a small version of a standard desktop PCI card. It has all the same features and functionality of a normal PCI card, but is about one quarter the size. The Mini-PCI bus is based on the Mini-PCI standard, and is electrically equivalent to the PCI bus found in many computers. A Mini-PCI card can include and/or provide functionality through hardware and/or software components, such as, for example, processors, memory, storage, modems, wireless communication means including Bluetooth, 802.11, and the like, as well as local area network (LAN) and wide area network (WAN) capabilities, and the like. It will be appreciated that, while the present implementation is described in terms of using the Mini-PCI card, a standard PCI card can be employed as can other devices known to provide similar capabilities.

In the present invention, the card implements an area of card memory such that image data and/or data necessary to generate an image can be written from the computer system 35 to a write buffer within the memory space. By way of example and not limitation, an image can comprise a graphical image, illustration, caricature, character, a message in word form, and a message in non-word form. An image can be a complete message such as "Current Temperature" while data necessary to generate the image can comprise information describing the message and control code indicating how the information describing the message is to be presented in order to display the desired message. For example, the letter "C" is the first letter of the phrase "Current Temperature" and if the "C" is generated as a block letter scrolling across a readerboard from right to left, the information describing the "C" and the control code might indicate that the first line of the "C" will be a full vertical line illuminating an entire column of LEDs on the readerboard. As this first vertical line moves left one column during the scrolling of the message, the next line might then be instructed to illuminate only the top and bottom LEDs because this would combine with the first line to help form the "C", and so forth until the "C" is illustrated. This process can continue for each letter until the full message (and/or image) is shown as desired.

In one embodiment of the invention, the card memory is a dual port memory having a read buffer and a write buffer. In a sequence of moving images, the image data (or, data necessary to generate the image) is received and stored, and display frames are then constructed at the frame rate, which corresponds to the number of frames or images that are displayed per second. The card also implements an area of card memory such that the display frame data representing the image can be retrieved from the read buffer within the memory and written to the LED Modules via a short cable 55, as shown in FIG. 2. While display driver 24 is shown in FIG. 2 as being separate from Mini-PCI card 27, it will be appreciated that display driver can be a part of, and integrated with, the Mini-PCI card itself. The card implements a means (such as a field programmable gate array (FPGA), for example) to swap the read and write buffer pointers when a new image (i.e., display) frame has been loaded, and the card controls the rate at which the image/display frames are written to the LED Modules (refresh rate) independent of the rate at which the images are written from the computer system (frame rate). The refresh rate is the number of times a display's image is repainted or refreshed per second. The refresh rate can be expressed in hertz so a refresh rate of 75 Hz means the image is refreshed 75 times in a second. In general, many refreshes of a particular image can occur before a new frame is loaded. The fact that the refresh rate is higher than the frame rate allows the eye to integrate red and green to yellow, for example.

In accordance with the present invention, when the AREcard is writing the contents of the read buffer out to the LED modules to display an image, it treats red and green data the same, but treats yellow data differently. When the AREcard logic encounters the code for a yellow pixel it substitutes the value for red. On the subsequent refresh, when that yellow pixel is next written, the AREcard logic will substitute the value for green. On the next refresh, the yellow pixel will be written as red. The LED module will respond by first illuminating red, then green, then red again. In one embodiment of the invention, the refresh rate is about 5 to 10 times faster than the fastest frame rate, meaning that this swap takes place several times before the moving image changes. The eye perceives that such a pixel is steadily illuminated yellow.

Figure 3:
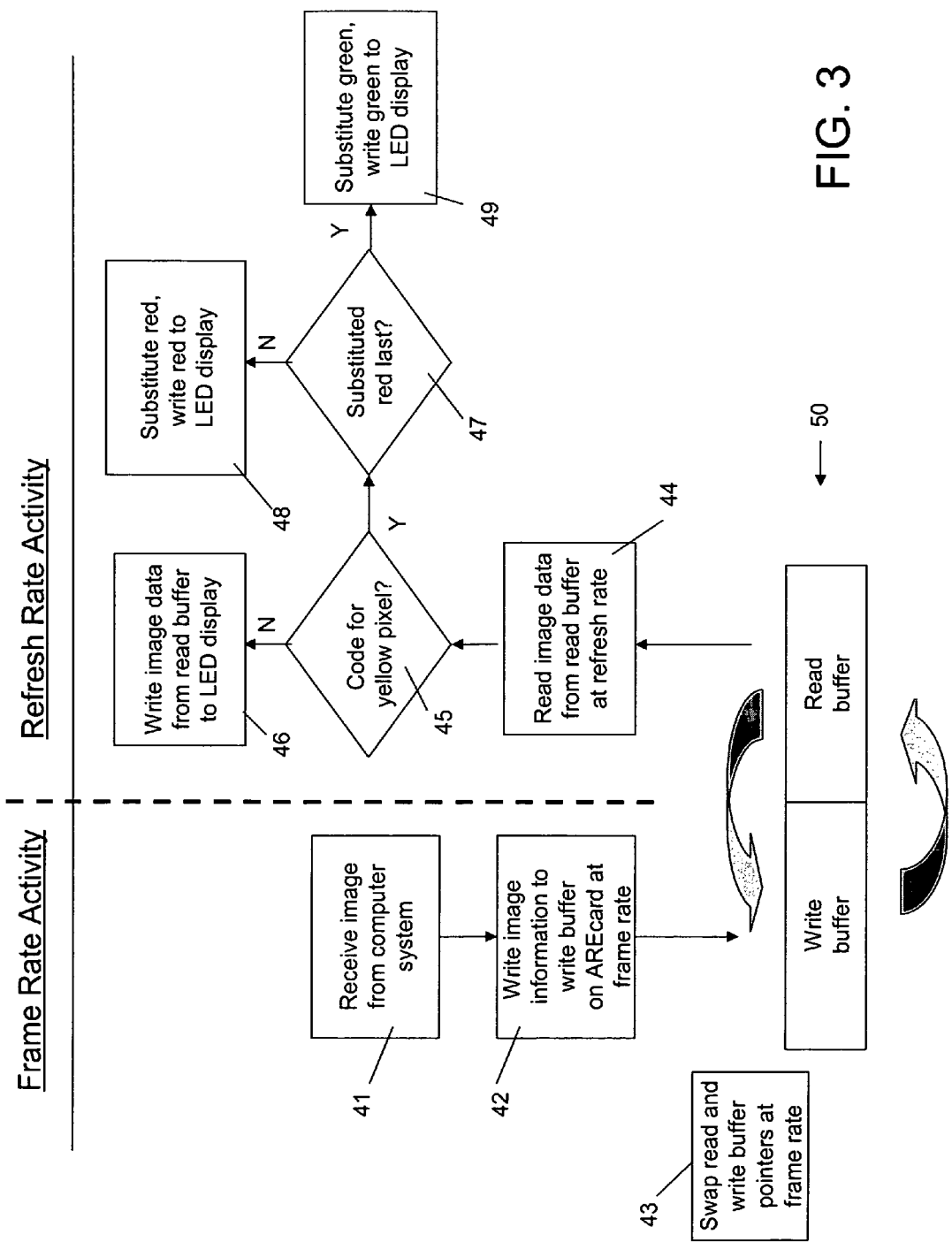
FIG. 3 is a diagram illustrating processes occurring in accordance with the present invention at different rates so as to allow the present invention to depict messages in desired colors while managing power consumption efficiently.

FIG. 3 shows a diagram illustrating coinciding steps occurring on the left side at the frame rate described above, and on the right side at the refresh rate described above. This diagram illustrates how one aspect of the present invention manages power efficiently while still illuminating the high efficiency LEDs so as to provide the visual perception of red, green and/or yellow colors. As shown in FIG. 3, the present invention receives image information from the computer system as at block 41 and writes this information to the write buffer of memory 50 associated with AREcard as at block 42. These steps are conducted at the frame rate which can be, for example, 30 frames per second. On the left side of the diagram in FIG. 3, block 43 illustrates that the read and write buffer pointers are swapped at the frame rate. The read and write buffer pointers point to the information in the read and write buffers of the memory 50 associated with AREcard. As at block 44, the image data from the read buffer is read and a determination is then made as at block 45 as to whether the image data includes the color yellow. If not, then the image data (e.g., including red or green color) is written to the LED display as indicated at block 46. Such an action may consume a level of power low enough to meet PoE requirements but high enough to provide an illuminating display.

Figure 4A:
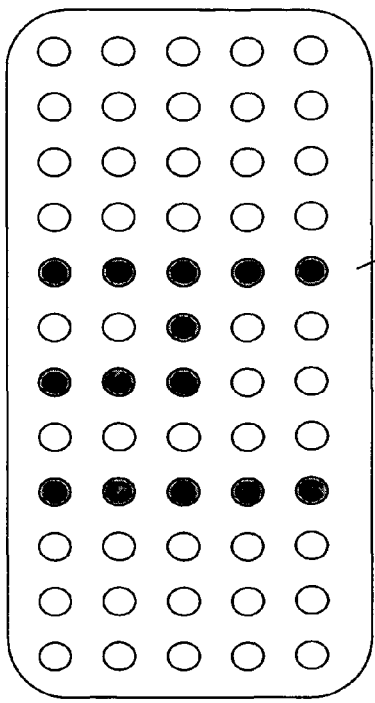
FIGS. 4A through 4C are sample "still shot" depictions of different LED reader boards in accordance with one aspect of the present invention.
Figure 4B:
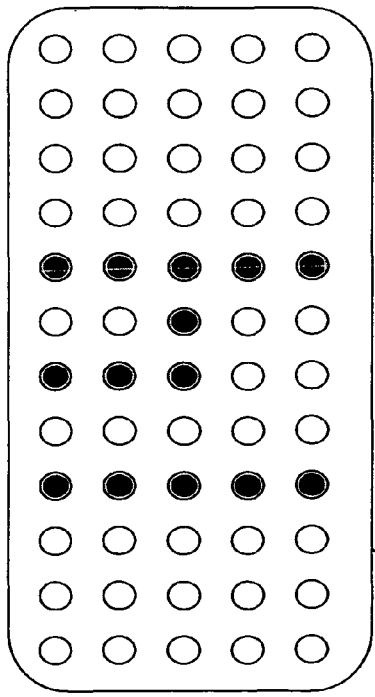
Figure 4C:
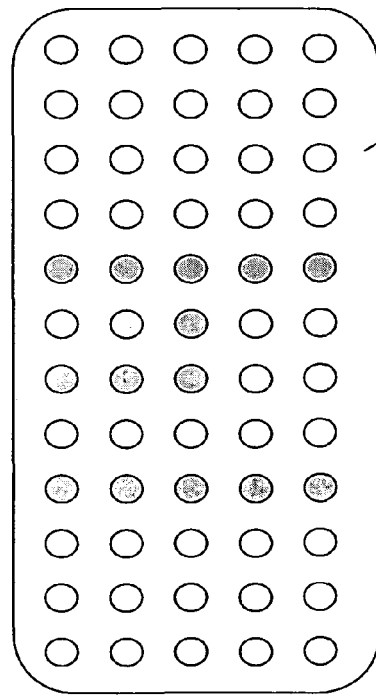

If the image data includes the color yellow, then a determination is made as at block 47 as to whether the color red was substituted the last time yellow was received. If red was last substituted, then green is substituted and written to the LED display as at block 49. Such a display might appear as at 60 in FIG. 4A for the instant in which the green color of the message "14" is displayed. If red was not last substituted, then red is substituted and written to the LED display as at block 48. Such a display might appear as at 61 in FIG. 4B for the instant in which the red color of the message "14" is displayed. The effect of cycling the red and green colors for the display at the refresh rate results in the display depicting the message "14" in yellow as at 62 in FIG. 4C, yet at only approximately half the power consumed by prior devices. The steps shown in FIG. 3 can be implemented by an FPGA designed for use with the AREcard of the present invention.

In one embodiment of the present invention, current drive technology is employed rather than voltage drive technology so that none of the LED current is wasted in current limiting resistors. Generally speaking, current drive mode improves efficiency. LEDs produce light as a function of the current passing through them, not as a function of the voltage across them. In operation, the current flow through an LED maintains a characteristic voltage drop across the LED of roughly 2.5 VDC. In a current driven arrangement, the LED current comes from a current source such as one of the Toshiba TB62726A™ series of constant current drivers, provided by Toshiba Corporation of Tokyo, Japan. Such a current driver is set to deliver a particular current, and the current source can be operated at 2.75 VDC to provide a sufficient margin for device to device variation.

In a voltage driven arrangement, the desired LED current is used to calculate the appropriate value for current limiting resistors to achieve that current in the circuit. If the source voltage is 5.0 Volts, and 2.5 Volts is dropped across the LED, then roughly half the power used by the LED display is dissipated in the current limiting resistors.

The present invention further can employ an on board switching power supply operating as an efficient 5V to 2.5V DC to DC converter located within block 14. The switching power supply can also include a current limit circuit set to hold the instantaneous current such that the overall power consumption is always consistent with the 15.4 Watt PoE limit. In the embodiment shown, the current limit is set to activate in conditions where ¾ of the columns in the display illustrated in block 14 are illuminated.

The display device contains both control logic circuits and LED drive circuits. For maximum power efficiency, the LED current sources should be run at the minimum possible voltage, roughly 2.5 VDC. For maximum noise immunity, the control logic circuits should operate at a higher voltage, typically 5 VDC. In the simplest scenario, the display device can be operated from a single power supply (5 VDC). The onboard switching power supply operates as an efficient 5V to 2.5V DC to DC converter. This allows the LED module to be operated from a single power supply with good noise immunity, but drives the LED current sources at a lower, more efficient voltage.

In one aspect of the present invention, the readerboard can be connected within a system that includes multiple computers or message delivery units sending messages to the readerboard. In a particular embodiment of the present invention, the readerboard can be connected to a first message device via a PoE or other connection for a primary set of messages, and further connected to a second message device via PoE or more conventional connection for a secondary set of messages. In this embodiment, the present invention can further operate such that the one of the message devices sends messages with a higher priority than the other device, such that the higher priority messages override any lower priority message. For example, a higher priority message system can be one relating to flight or train schedules, security systems, and systems that generate general safety threats (e.g., bomb, severe weather, dangerous road conditions, etc.), while a lower priority message can be general non-emergency messages such as time of day, temperature, sales advertising, traffic directions and the like. In one aspect of this embodiment of the present invention, power can be provided by one of the message devices (e.g., the message device having messages with higher priority) so as to avoid potential power conflict issues associated with two sources of power connected to one power-drawing device.

In a particular embodiment, the present invention provides a readerboard that can activate messages received from an emergency or other messaging system or device on a high priority, while being connected to a separate input (e.g., via a TCP/IP connection on the readerboard) for lower priority messages. In such an embodiment, the readerboard can be powered from a PoE source, which has battery backup in case of a power failure. Alternatively, the readerboard can be powered by the high priority messaging system and/or device along the same conduit as the message communication. It will be appreciated that the present invention can employ Lightlink™ software running on a personal computer or other computer connected to the readerboard via the alternate connection. Lightlink™ is a middleware program provided by Inova Solutions, Inc. of Charlottesville, Va. that can collect data from any source and allow it to be shared between applications or delivered to business users through real-time display, performance tracking, and reporting and analysis solutions. It will further be appreciated that the readerboard can be controlled by an emergency messaging or security system or device.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A visual messaging system, comprising:
   a remote computer;
   a visual messaging device in communication with the remote computer via a network interface, with the network interface permitting network communication and power provision to the visual messaging device;
   programming for transmitting data necessary to generate an image from the remote computer to the visual messaging device;
   programming for storing and retrieving the necessary data within the visual messaging device;
   programming for determining whether a yellow pixel is to be written; and
   programming for writing a red pixel and a green pixel in sequence and repeatedly at a refresh rate which gives the visual impression that the pixel is illuminated yellow.

2. A method of displaying messages on a visual messaging device, comprising the steps of:
- providing a remote computer;
- providing a visual messaging device in communication with the remote computer Via a network interface, with the network interface permitting network communication and power provision to the visual messaging device;
- transmitting data necessary for generating an image from the remote computer to the visual messaging device;
- storing and retrieving the data within the visual messaging device;
- determining whether a yellow pixel is to be written; and
- upon determining that a yellow pixel is to be written, writing a red pixel and a green pixel in sequence and repeatedly at a refresh rate which gives the visual impression that the pixel is illuminated yellow.

3. The method of claim 2 wherein the steps of transmitting, storing and retrieving, determining and writing are performed by a Mini-PCI card.

* * * * *